United States Patent
Gosselin et al.

(10) Patent No.: US 7,392,722 B2
(45) Date of Patent: Jul. 1, 2008

(54) CONTROL UNIT WITH THREE PARALLEL BRANCHES

(75) Inventors: Florian Gosselin, Fontenay aux Roses (FR); Eric Villedieu, Venelles (FR); Jean-Pierre Friconneau, Fontenay le Fleury (FR)

(73) Assignee: Commissariat A l'Energie Atomique, Paris (FR)

( * ) Notice: Subject to any disclaimer, the term of this patent is extended or adjusted under 35 U.S.C. 154(b) by 634 days.

(21) Appl. No.: 10/501,939

(22) PCT Filed: Jan. 20, 2003

(86) PCT No.: PCT/FR03/00170

§ 371 (c)(1),
(2), (4) Date: Jul. 20, 2004

(87) PCT Pub. No.: WO03/062939

PCT Pub. Date: Jul. 31, 2003

(65) Prior Publication Data

US 2005/0081673 A1    Apr. 21, 2005

(30) Foreign Application Priority Data

Jan. 22, 2002    (FR) .................................. 02 00755

(51) Int. Cl.
*G05G 11/00*    (2006.01)

(52) U.S. Cl. .................... 74/490.06; 74/490.08; 901/29; 414/729

(58) Field of Classification Search ............. 74/490.01, 74/490.06, 490.08, DIG. 9; 901/29; 414/729; 185/27

See application file for complete search history.

(56) References Cited

U.S. PATENT DOCUMENTS

| 2002/0166404 | A1* | 11/2002 | Rosheim ................... 74/490.06 |
| 2003/0005786 | A1* | 1/2003 | Stuart et al. ............... 74/479.01 |
| 2004/0149065 | A1* | 8/2004 | Moran ....................... 74/490.04 |
| 2004/0211284 | A1* | 10/2004 | Roy et al. ................. 74/490.01 |
| 2007/0138374 | A1* | 6/2007 | Nishibashi et al. ....... 250/208.1 |

FOREIGN PATENT DOCUMENTS

| EP | 0540197 A1 | 5/1993 |
| WO | 9504959 A1 | 2/1995 |

OTHER PUBLICATIONS

Patent Abstracts of Japan for Publication No. 2000-181618, published Jun. 30, 2000.

* cited by examiner

*Primary Examiner*—David M Fenstermacher
(74) *Attorney, Agent, or Firm*—Pearne & Gordon LLP

(57) ABSTRACT

This controller, between a fixed base (1) and a control handle (4), comprises three similar arms (2) of which each comprises three links (5,6,7) jointed between the base and the handle platform by a pivot (8), two rotation joints (9 and 10) and a ball-joint (11). This controller with six degrees of freedom includes force feedback motors at the first and second joints (8 and 9) of which the first is fixed to the base (1) and the second to the first link (5), so that the first is immobile and the other has scarce movement; the third joint (10) is free. The resulting structure is simple and light not requiring any parallelogram, and kinematic singularities are greatly reduced.

6 Claims, 3 Drawing Sheets

CONTROL UNIT WITH THREE PARALLEL BRANCHES

Figure 1:
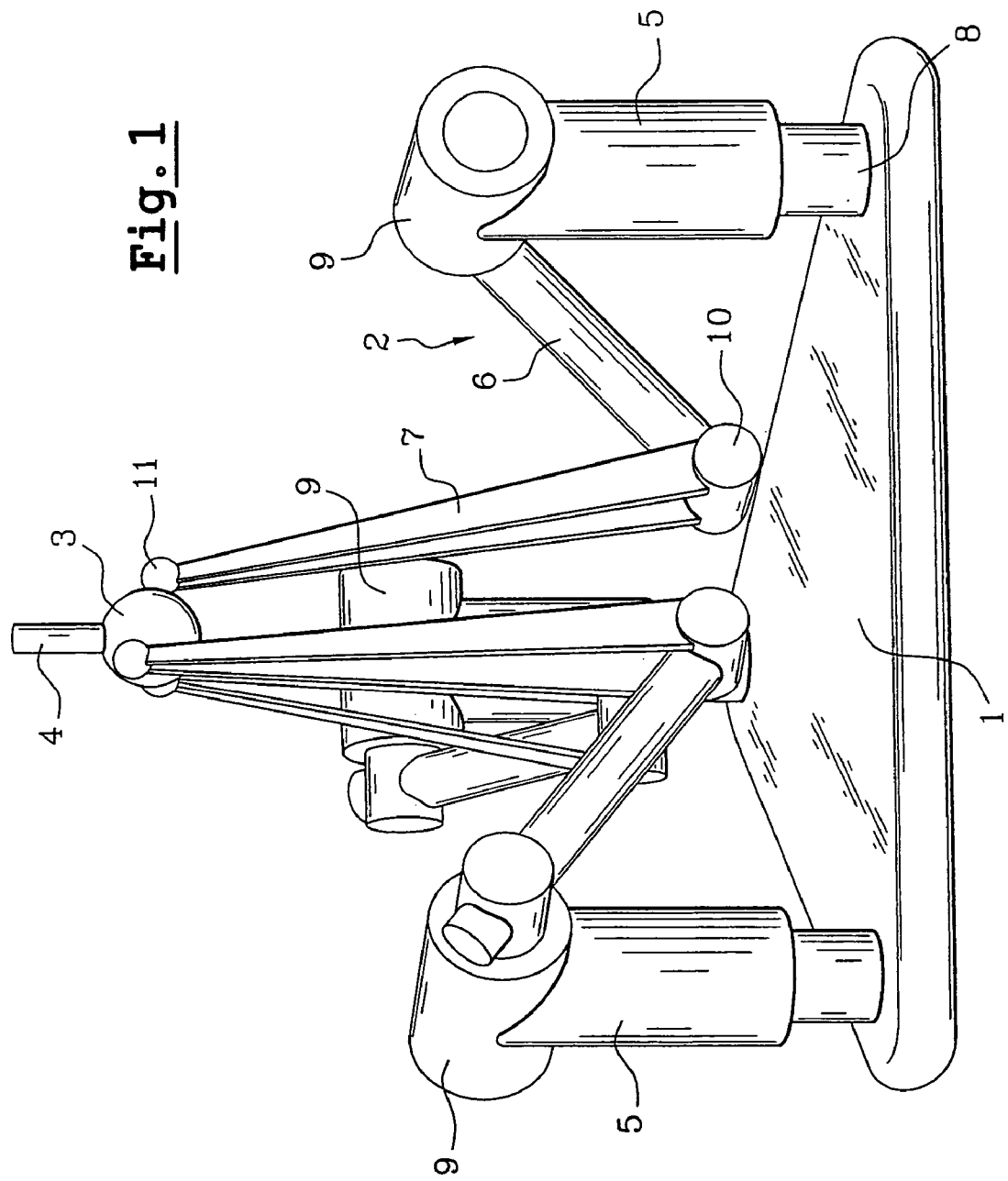

The invention concerns a controller with three parallel branches.

Controllers are intended for varied procedures such as remote handling, remote surgery, games, or the controlling of other machines by recording and communicating movements which the operator causes them to undergo. Their structures comprise a variable number of degrees of freedom with which to command en equal number of operations.

Different types of structures for controllers are known, but the most widespread comprise a succession of mutually jointed links between a generally fixed base and a handle held by the operator. These successions of links are called arms. Often single-arm types are found and the controller is then a jointed arm or "serial arm" which, to obtain a great number of degrees of freedom, requires either a high number of onboard motors at the different joints or complex transmissions if the motors are placed close to the base. In all cases, mounting is necessarily complex. Controllers with two or three arms are also known mounted in parallel between the base and the handle with which it is possible to obtain a large number of degrees of freedom while maintaining simple arm structure. The arms then converge towards a platform carrying the handle and are connected to it by double joints (cardan or universal joints) or triple joints (ball joints).

Several pitfalls must be avoided by the designer of controllers of this type: it is indicated that configurations should be avoided which cannot be attained or which can only be attained via an indeterminate movement unable to generate a proper command; the configurations of the first type often relate to collisions between arm links and those of the second type to kinematic singularities derived for example from coupling between joint movements. It is further preferable to limit the mechanical complexity of the structure. Finally, it is advantageous that the so-called force feedback motors, which are needed to retain the joints at their end-point position to which they were brought by the operator and to oppose resistance to movement for more comfortable controlling, should be mounted on the base rather than on the mobile arms since their volume lends to more probable collisions and their weight has to be supported by arms of sufficient section to carry such weight and are therefore heavier. Also, arm movements may cause a variation in the bending forces exerted by the motors on account of their overhang and hence in the equilibrium conditions of the controller.

It is evident that these conditions cannot all be met simultaneously and that no ideal structure exists for a controller comprising for example six degrees of freedom and three parallel arms. A controller of this type exists whose six motors associated with the six degrees of freedom are all mounted on the base, but the three arms are connected to the base via double joints which, in addition to greater complexity in design and adjustment than single joints, require couplings of movement which are detrimental to the efficacy of force transmission. One bibliographical source is the article "Kinematic analysis of a novel 6-DOF parallel manipulator" by Cleary and Brooks, IEEE; 1050-4729, 1993, pp. 708 to 713.

In several other controllers some links are split into a parallelogram or pantograph. Instead of having to arrange motors on the two joints at the ends of these links, the motors may be placed on two lower apexes of the parallelogram or pantograph to exert a smaller overhang, but these motors are therefore all mobile and dividing the link is not excellent. One example is the controller developed by Iwata called "Haptic Master" described on the Tsukuba internet site (http:/:intron/kz.tsukuba.ac.jp/HM/txt.html); and others are given in the article 'A 6-DOF force-reflecting hand controller using the fivebar parallel mechanism" by Woo, Jin and Kwon, Proceedings of the IEEE, International Conference on Robotics & Automation, Louvain, Belgium, May 1998, pp. 1597-1601.

The controller of the invention is characterized by great simplicity of structure combined with a small number of mobile motors. Also the mobile motors are not positioned unfavourably, i.e. they are not likely to produce a substantial, variable overhang or to enter easily into collision with other controller parts.

To summarize, the controller of the invention which comprises three parallel arms connecting a base to a platform carrying a handle (or any other grasping means) is characterized in that the arms are made up of three links, of which a first link joined to the base by a first joint which is a pivot joint of the first link about itself, a second link joined to the first link by a second joint which is a rotation joint to modify an angle between the first link and the second link, a third link joined to the platform by a ball-joint and to the second link by a third joint which is a rotation joint to modify an angle between the second link and the third link, and in that the arms only comprise two force feedback motors of which a first motor fixed to the base and measuring pivot movements of the first link and a second motor positioned on the second joint and measuring rotations between the first link and the second link.

Details of the advantages obtained are described below. It can be added however that kinematic singularities are considerably reduced by implanting the first links on the base in diverging directions and, preferably, at an incline of around 40° to the vertical (or more generally on a normal to the plane passing through the three implant points of the first links). This value of 40° is only approximate, there is no clear limit to angle of incline that is recommended, and it was simply found that singularities were substantially less probable at around this value.

Figure 2:
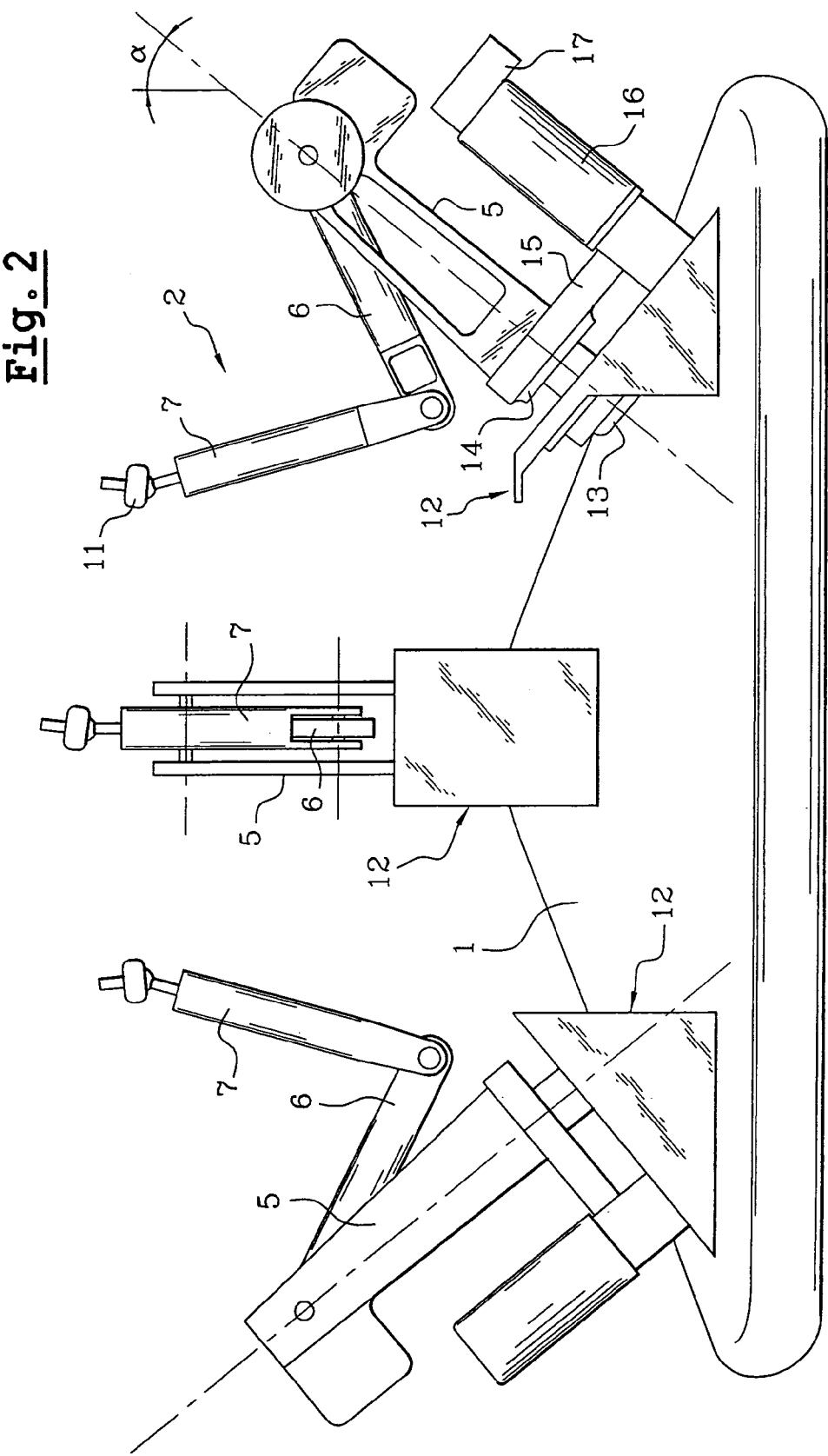
Figure 3:
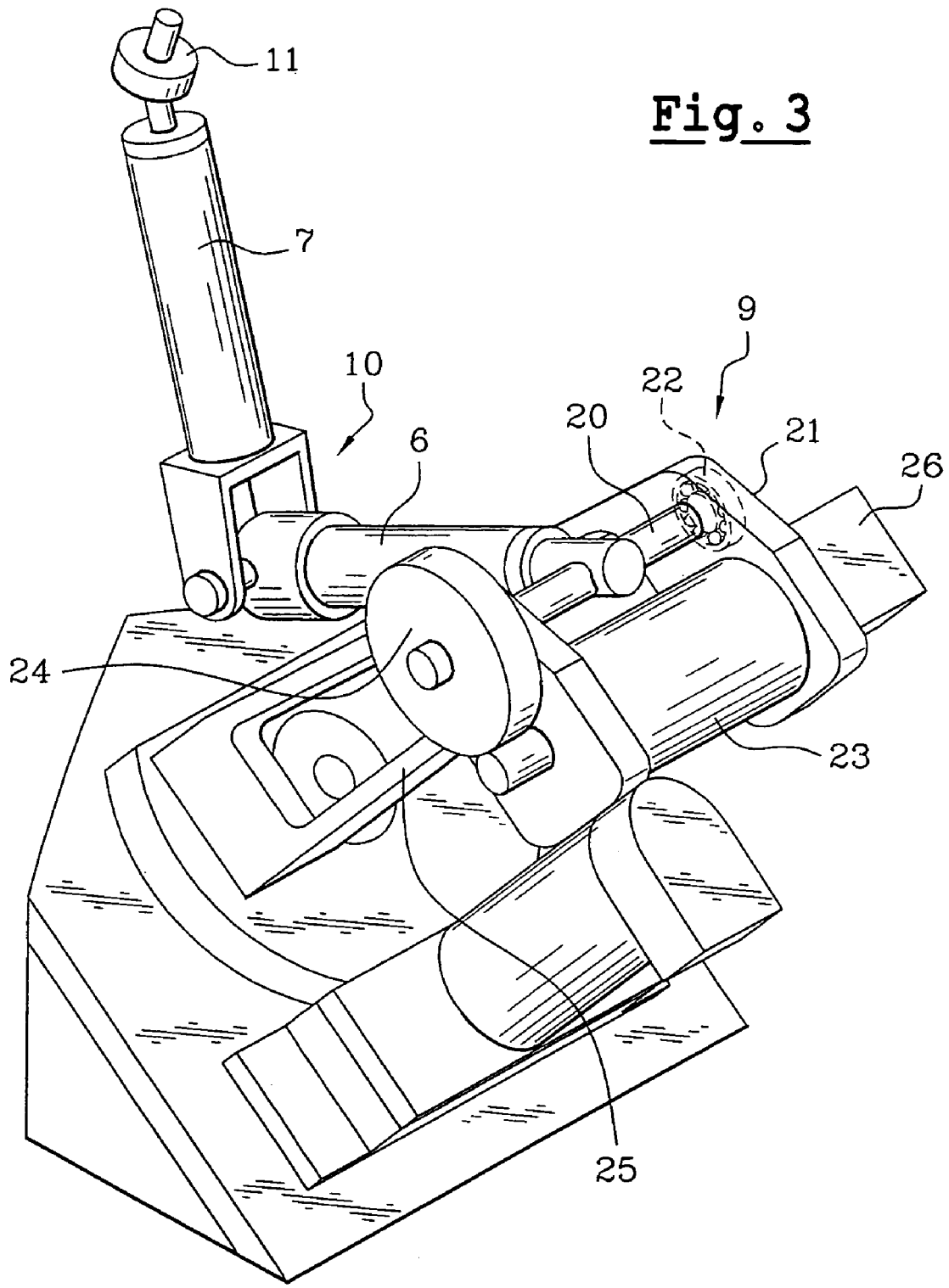

The invention will now be described with reference to the figures, of which FIG. 1 is a general view of the invention and FIGS. 2 and 3 illustrate a favourite embodiment with details of the force feedback motors and link joints.

With reference to FIG. 1. A base carries reference 1 and the controller chiefly comprises three similar arms, all referenced 2 and made up of three links jointed between base 1 and platform 3 to which a handle 4 is fixed held by the operator; platform 3 may be flat as is frequent or, as here, ball-shaped. Each of arms 2 comprises a first link 5 jointed with base 1, a third link 7 jointed with platform 3, and a second link 6 jointed with the two previous links. Arms 2 further comprise a first joint 8 between base 1 and the first link 5, a second joint 9 between the first and second links 5 and 6, a third joint 10 between the second and third links 6 and 7, and a ball-joint 11 between the third link 7 and the platform 3. The first joint 8 is a pivot joint, i.e. its axis is co-linear to the first link 5, which may therefore rotate about itself on base 1; the second and third joints 9 and 10 are rotation joints, which enable changing of the angles between the links leading to them, namely the second link 6 and respectively the first link 5 and the third link 7. In this configuration, the axes of these rotation joints are therefore perpendicular to the links which they connect and, in addition, they are parallel to one another. In other embodiments this is not necessarily the case. It is seen that the platform 3 may be moved along the usual three degrees of freedom for translation in space and in rotation about three different axes, by movements reflected by arms 2 and non-resisted by these arms. The six degrees of freedom of the controller are therefore obtained.

With reference now to FIGS. 2 and 3, in which for reasons of clarity the platform and the handle are not shown, which illustrate a slightly different embodiment in which the first links 5 are not parallel to one another and vertical to a planar, horizontal base 1, but are inclined in diverging directions forming an angle α of around 40° relative to the normal of base 1. This arrangement makes it possible to distance outwardly the third links 7 which are close to one another in the preceding embodiment, and hence to reduce the risk of collision between these third links 7 and also to move kinematic singularities outside the effective workspace. Base 1 then comprises inclined pedestals 12 on which the first links 5 are mounted via a bearing 13 which materializes the first joint 8. The foot of the first links 5 carries a pulley 14 around which a belt 15 is tensioned; the other end of the belt 15 is tensioned around the shaft of a motor 16 also fixed to pedestal 12 and which comprises a encoder 17 measuring the rotational movements of the shaft. A device of this type forms force feedback means via which the motor 16, through its resistance, maintains link 5 at rest at the position it has reached; but when a movement is imposed upon the first link 5, the encoder 17 records the same enabling control of the machine, not shown, dependent upon the controller. This motor 16 is fixed since it is attached to base 1, which is advantageous for the above-mentioned reasons. It will be noted that to actuate part 14, any other equivalent means may be used (gearing, cable, etc . . . ).

Rotation joints 9 and 10 are each materialized by a pin supported by a clevis 21 attached to one of the links connected by the joint, and the other link is fixed to pin 20. Pin 20 attached to the second link 6 in the second joint 9 is jointed with clevis 21 attached to the first link 5 by bearings 22. Clevis 21 carries a motor 23, and pin 20 carries a pulley 24. A belt 25 or any other transmission means, is tensioned between pulley 24 and the shaft of motor 23, and an encoder 26 measures the shaft movements of the motor 23. This is a force feedback device that is similar to the previous one. Rotation movements of the second link 6 relative to the first link 5 are recorded by the encoder 26 and the motor 23 supports the second link 6 at the position it has reached.

The third joint 10 is similar in structure to the second joint 9, but it is smaller since it does not include a force feedback motor: it is free and passive just like ball-joint 11. Therefore the force feedback motor 23 is not fixed to the base but only accompanies the pivot movements of the first link 5 and therefore makes little movement, which reduces unbalance and risks of collision it could possibly cause almost to the same extent as if it had been fixed to the base. It will be noted that links 5, 6 and 7 are simple i.e. they do no comprise any parallelogram or pantograph.

The invention claimed is:

1. A controller comprising three parallel arms (2) connecting a base (1) to a platform (3) carrying grasping means such as a handle (4), the arms comprising three links (5,6,7) of which a first link (5) is joined to the base by a first joint (8) which is a pivot joint of the first link about itself, a second link (6) joined to the first link (5) by a second joint (9) which is a rotation joint to modify an angle between the first link and the second link, a third link (7) joined to the platform (3) by a ball-joint (11) and to the second link (6) by a third joint (10) which is a rotation joint to modify an angle between the second link and the third link, wherein each of the arms only comprise two force feedback motors (16,23), of which a first motor (16) fixed to the base (1,12) and measuring pivot movements of the first link (5) and a second motor (23) positioned on the second joint (6) and measuring the rotations between the first link and the second link.

2. The controller as in claim 1, wherein the first links (5) are implanted on the base (1,12) in diverging directions.

3. The controller as in claim 2, wherein the first links (5) are implanted on the base (1,12) at an incline of 40° relative to a direction perpendicular to the base.

4. The controller as in claim 2, wherein the first links (5) are implanted on the base (1,12) at an incline of 40° relative to a direction perpendicular to the base.

5. The controller as in claim 1, wherein the first links (5) are implanted on the base (1,12) in diverging directions.

6. A controller consisting of a base, a platform carrying grasping means such as a handle (4), three parallel arms (2) connecting a base (1) to the platform (3) and six force feedback motors, the arms comprising three links (5,6,7) of which a first link (5) is joined to the base by a first joint (8) which is a pivot joint of the first link about itself, a second link (6) joined to the first link (5) by a second joint (9) which is a rotation joint to modify an angle between the first link and the second link, a third link (7) joined to the platform (3) by a ball-joint (11) and to the second link (6) by a third joint (10) which is a rotation joint to modify an angle between the second link and the third link, wherein each of the arms comprises two force feedback motors (16,23), of which a first motor (16) fixed to the base (1,12) and measuring pivot movements of the first link (5) and a second motor (23) positioned on the second joint (6) and measuring the rotations between the first link and the second link.

* * * * *